United States Patent
Glickman (10) Patent No.: US 6,826,301 B2
(45) Date of Patent: Nov. 30, 2004

(54) DATA TRANSMISSION SYSTEM AND METHOD

(75) Inventor: Jeff B. Glickman, Las Vegas, NV (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/267,058

(22) Filed: Oct. 7, 2002

(65) Prior Publication Data

US 2004/0066968 A1 Apr. 8, 2004

(51) Int. Cl.[7] .............................................. G06K 9/36
(52) U.S. Cl. ..................... 382/166; 382/236; 382/240; 348/360; 379/202.1
(58) Field of Search ................................. 382/166, 162, 382/164, 240, 235; 379/202.1; 370/352; 345/589, 597, 598, 600, 604; 348/453, 455, 441, 500; 709/204, 201; 375/240.28; 455/72

(56) References Cited

U.S. PATENT DOCUMENTS

| | | | | |
|---|---|---|---|---|
| 5,764,964 A | * | 6/1998 | Dwin et al. ................... | 345/546 |
| 5,798,753 A | * | 8/1998 | Zhou et al. ................... | 345/603 |
| 5,875,044 A | * | 2/1999 | Seto et al. .................... | 358/518 |
| 5,916,302 A |   | 6/1999 | Dunn et al. ................... | 709/204 |
| 5,930,390 A | * | 7/1999 | Coelho ......................... | 382/168 |
| 6,141,709 A | * | 10/2000 | Cutter .......................... | 710/100 |
| 6,151,136 A | * | 11/2000 | Takemoto .................... | 358/1.9 |
| 6,233,605 B1 |   | 5/2001 | Watson ......................... | 709/204 |
| 6,243,420 B1 | * | 6/2001 | Mitchell et al. ............... | 375/240.18 |
| 6,381,280 B1 | * | 4/2002 | Lynch et al. .................. | 375/240.19 |
| 6,501,395 B1 | * | 12/2002 | Ghildiyal ...................... | 341/51 |
| 6,603,883 B1 | * | 8/2003 | Hamanaka .................... | 382/239 |
| 6,661,427 B1 | * | 12/2003 | MacInnis et al. ............. | 345/660 |
| 2002/0196378 A1 | * | 12/2002 | Slobodin et al. ............. | 348/744 |

OTHER PUBLICATIONS

"LZO Data Compression Library Version 1.07", Oberhumer, Oct. 18, 2000, www.oberhumer.com/opensource/lzo, pp. 1–4.

"LZOP File Compressor Version 1.00", Oberhumer, Apr. 27, 1998, www.oberhumer.com/opensource/lzop, pp. 1 and 2.

* cited by examiner

*Primary Examiner*—Bhavesh M. Mehta
*Assistant Examiner*—Barry Choobin
(74) *Attorney, Agent, or Firm*—Schwabe, Williamson & Wyatt, P.C.

(57) ABSTRACT

Preferred data compression and decompression processes (500, 600) of this invention speed transmission of a color XGA image (502). A first compression step employs an RGB-to-YCrCb color conversion compression process (504), and a second step employs an Lempel-Ziv-Oberhumer ("LZO") compression process (506) for generating compressed image data for transmission through a wireless transmission medium. A preferred data decompression process receives the compressed image data from the LZO compression process. A first decompression step employs an LZO decompression process (602), and a second decompression step employs a YCrCb-to-RGB color conversion decompression process (604) for generating decompressed data suitable for rendering an image (606) that is substantially the same as the original XGA image.

19 Claims, 4 Drawing Sheets

DATA TRANSMISSION SYSTEM AND METHOD

RELATED APPLICATIONS

Not applicable

FEDERALLY SPONSORED RESEARCH OR DEVELOPMENT

Not applicable

TECHNICAL FIELD

This invention relates to multimedia teleconferencing systems and methods, and in particular, to high-speed graphics data compression and decompression techniques for use with such systems and methods.

BACKGROUND OF THE INVENTION

It is time-consuming, difficult, and expensive to set up a combined audio and visual presentation conference between remotely located conference sites. One known approach is video conferencing, which involves two or more video conference devices of the type sold by PictureTel Corporation of Andover, Mass., USA. Such devices are expensive and optimized to support full-motion person-to-person video. They often employ ISDN lines for high-speed data communication, which adds to the total solution cost and hinders mobility of the system. In many instances, full-motion video is unnecessary for an effective conference.

Transmitting computer graphic (CG) data is a different class of problem, relatively unrelated to video conferencing. However, the telephonic transmission of even simple graphics images is unduly time consuming. A common practice among presenters is to display computer-generated visual aids or images. Video conferencing systems typically do not provide convenient tabletop connectivity for integrating presentation images with the video transmission. Rather, it may be necessary to adjust the video conferencing system so that its video camera is aimed toward a screen where presentation images are displayed, e.g., via a computer display or multimedia projector. However, in practice there is insufficient resolution in a video conferencing system, resulting in a low-quality, blurry image that is generally unreadable for normal text.

It is also known to use both a telephone and a computer for sharing presentation materials between a local site and a remote site over a computer network concurrently with an audio telephone conference. In known methods, separate connections are established manually for the voice call (via the telephone network) and for the data or images (via the computer network).

Other data conferencing systems use a centralized computer server to set up and manage the audio and data connections. For example, U.S. Pat. No. 5,916,302 of Dunn et al. describes using a Public Switched Telephone Network ("PSTN") for the audio component of a data conference and a centralized server computer accessible via a computer network for distributing the video or image component of the data conference. Participants using the Dunn et al. system access the server computer to download images using Web browser software of a personal computer.

U.S. Pat. No. 6,233,605 of Watson describes a low-bandwidth remote conferencing system that uses a PSTN for the audio component and networked computers for the visual component. Before a conference, data representing visual images is distributed to computers of conference participants. During the conference, one participant, a leader, periodically issues selection signals to all computers, causing them all to select one of the distributed images and display it. The selection signals and the telephone conference are carried by a single voice-grade telephone channel. The system requires distribution of the presentation images in advance of the telephone conference and does not address the desire to avoid manual interaction with the computer at each site to initiate downloading of the image data. Furthermore, there are some types of presentations for which images cannot be prepared in advance of the presentation and that involve interactive use and display of a software application such as a spreadsheet or drawing program. For example, budget planning and review sessions, design conferences, and distance learning could all benefit from the ability to interact with a software program at one or more of the sites, and have the software program display its output all of the participating sites nearly simultaneously.

While many conference facilities include a network connection point, such as a wall jack for an Ethernet, most facilities do not keep a computer connected to the network. Consequently, a significant amount of time is required to configure the network connection for the computer that will be used at each of the conference sites. The time and difficulty of connecting to the network may be compounded by the use of laptop or other mobile computers that are configured for use with other networks or at other locations within the same network, and not configured for use at the conference site. None of the systems described above overcome the difficulties associated with configuring a computer for connection to a computer network at each of the conference sites in advance of each data conference session.

Wireless interconnectivity techniques have been considered for easing the time and complexity burden associated with setting up multimedia data conferencing systems. However, whether wired or wireless, interconnect systems transfer image data more slowly than desired. Such systems must, therefore, include some sort of data compression and decompression process for transferring images data among components of the system without degrading the image quality. For a system to be suitably "interactive, " the compression and decompression process should transfer a full 1,024 by 768 pixel ("XGA") image between devices, such as a laptop computer and a video projector, in one second or less.

A need exists, therefore, for a highly interactive data conferencing apparatus that includes a wireless high-speed interconnectivity solution and a data conferencing control mechanism.

SUMMARY OF THE INVENTION

An object of this invention is, therefore, to provide a data compression and decompression apparatus and a method for wirelessly transferring high-resolution, color image data among devices in one second or less.

Another object of this invention is to provide such an apparatus and method that is perceptively lossless and, therefore, maintains image quality.

A further object of this invention is to provide such an apparatus and method that minimizes the amount of computing resource.

In a data conferencing system suitable for use with this invention, each of two or more geographically separate conference sites has a telephone receiver and a data conferencing appliance coupled to a voice call network, such as a PSTN or PBX. Each site also has a display device, such as a computer display screen or an electronic projector, for displaying images comprised of image data produced by an image source. To facilitate sharing of image data between the sites, a network interface at each site couples a data conference control unit of the data conferencing appliance to a data network that links the sites independently of the voice call network.

In a preferred embodiment, the data conference control unit, telephone receiver, and network interface are integrated in a data conferencing speakerphone appliance that can be conveniently positioned on a conference table at each of the sites and wirelessly coupled to the data network to facilitate data conferencing in accordance with this invention.

In other embodiments, the data conferencing appliance is implemented in software operating on a computer workstation that can also serve as the display device, telephone receiver, and/or image source; or in hardware as a simplified data conferencing appliance that can be used with a separate telephone receiver, display device, and image source. Data conferencing appliances in accordance with the invention may include wireless network connections and automatic network configuration routines for wireless connection of an image source, such as a presenter's laptop computer, to the data network. Data transfer speed among the wireless connections is enhanced by data compression and decompression processes of this invention.

In particular, the data compression and decompression processes of this invention employ dual compression for first compressing data, such as a computer screen image, and transferring the compressed data over a wireless link, such as an IEEE 802.11b transport medium. The transported compressed image data is then decompressed using dual decompression for reconstructing the original image. The combined compression and decompression technique provides high performance, high image quality, good compression, and is perceptibly lossless. The compression and decompression technique may be used over virtually any wired or wireless communications channel.

In a preferred data compression process of this invention, the data source is a full screen, color, XGA image, which is processed to obtain a bitmap. A two step compression process is employed to obtain the required amount of data compression. The first step employs a color conversion compression process, and the second step employs an Lempel-Ziv-Oberhumer ("LZO") compression process, which generates the compressed data for transmission through a transmission medium.

In a preferred data decompression process of this invention, the compressed data from the LZO compression process is applied to a two step decompression process. The first step employs an LZO decompression process, and the second step employs a color conversion decompression process, which generates decompressed data for rendering a bitmap that is substantially the same as the original bitmap.

High-performance color conversion is required to meet the one second latency goal. Color conversion is normally accomplished with floating point calculations. However there are typically insufficient computing resources available, so a high-speed integer embodiment of this invention is preferably employed. RGB-to-YCrCb co-sited 4:2:0 color conversion is employed to compress the image data. In a preferred embodiment, input RGB data is in a 4:4:4 format, and output YCrCb data is generated in a 4:2:0 format. Of course, other formats may be employed. High performance is achieved by employing factored integer arithmetic. A YCrCb-to-RGB decompression process is employed to reconstitute the compressed image.

Additional objects and advantages of this invention will be apparent from the following detailed description of preferred embodiments thereof that proceed with reference to the accompanying drawings.

DETAILED DESCRIPTION OF PREFERRED EMBODIMENTS

The terminology used in this application, including terms in the Summary of the Invention, Detailed Description of Preferred Embodiments, and claims sections, shall have the following meanings unless otherwise clearly indicated by the context in which used:

"data network"—a network for transmitting data encoded as digital signals, including, e.g., local area networks (LANs), wide area networks (WANs), virtual private networks (VPN), and the Internet. A data network may include one or more wired, wireless, or modem transmission path segments that transmit data. Path segments may also include PSTNs, EKSs, PBXs, cellular, PCS, satellite telephone, and marine telephone segments.

"display device"—any device for displaying characters or images including direct-view displays such as computer monitors, raster displays, and the like, as well as indirect displays such as electronic projector devices of the type sold by InFocus Corporation, Wilsonville, Oreg., USA, the assignee of this application, regardless of where mounted and whether or not capable of direct connection to a data network.

"DTMF" (dual-tone multi-frequency)—tones of the type generated when keys of a telephone's touchpad are depressed, including the 12 distinct tone pair frequency combinations used for what is commonly known as "touch-tone" dialing, as well as other tone pair frequency combinations not available on a telephone touchpad.

"image source"—a device that generates, produces, or reproduces a set or stream of data representing one or more still images or video frames; example image sources include personal computers, laptop computers, video playback devices such as DVD players and VCRs (with either analog or digital video outputs), digital cameras (still or motion-picture, including "webcams"), digitizing scanners, and personal digital assistants (PDAs).

"key" or "input key"—a interface device such as a pushbutton, a switch, or a graphical user interface button capable of being activated by a mouseclick or other computer input action; or any other input device for receiving one or more bits of data used to initiate negotiation procedures or to trigger other events within the system.

"network device access code" or "network access code address"—any type of address or code for accessing a device on a data network; example network access codes may include, without limitation, network addresses such domain names, uniform resource locators (URLs), IP addresses (including static, dynamic, symbolic, and virtual addresses) compliant with IPv4 or IPv6 (including IPv4 with classless interdomain routing (CIDR)), and physical addresses (e.g., Ethernet addresses); and/or passcodes such as session identification codes, passwords, cookies, encryption codes or keys, and digital signatures.

"POTS"—acronym for "plain old telephone system"; a widely-used suite of telephone interface and protocol standards that provides interoperability between the networks of voice telephone services providers worldwide; POTS networks typically include circuit switched telephone networks and equipment for use therewith, although some packet switched networks may also interface with POTS networks.

"Public Switched Telephone Network" (PSTN)—an aggregate of telephone communication resources available to the public at large. Examples include resources providing local and long-distance land-based, wireless, cellular, marine, radio telephone, and satellite telephone services.

"telephone receiver"—all types of devices capable of connection to a voice network for receiving analog or digital signals representative of audio telecommunications, including, without limitation, POTS, telephone receiver sets, PBX telephone receiver sets, EKS telephone receiver sets, ISDN telephone receivers, VoIP telephones, speakerphones, headsets, wireless telephone handsets, cellular or PCS telephones, computer workstations with telephone emulation software and any other analog or packet telephone devices.

"voice network"—any network configured to handle voice calls; typically a POTS network, but possibly including packet-switched networks and portions of data networks over which a voice-over-IP call is made.

"voice-over-IP" (VoIP)—an audio call in which the call path traverses a data network; VoIP involves digitizing the audio signal, transmitting the digitized signal over a packet-switched data network using Internet Protocol (IP), and converting the digitized signal back to analog audio for listening at the receiving end of the audio call.

Figure 1:
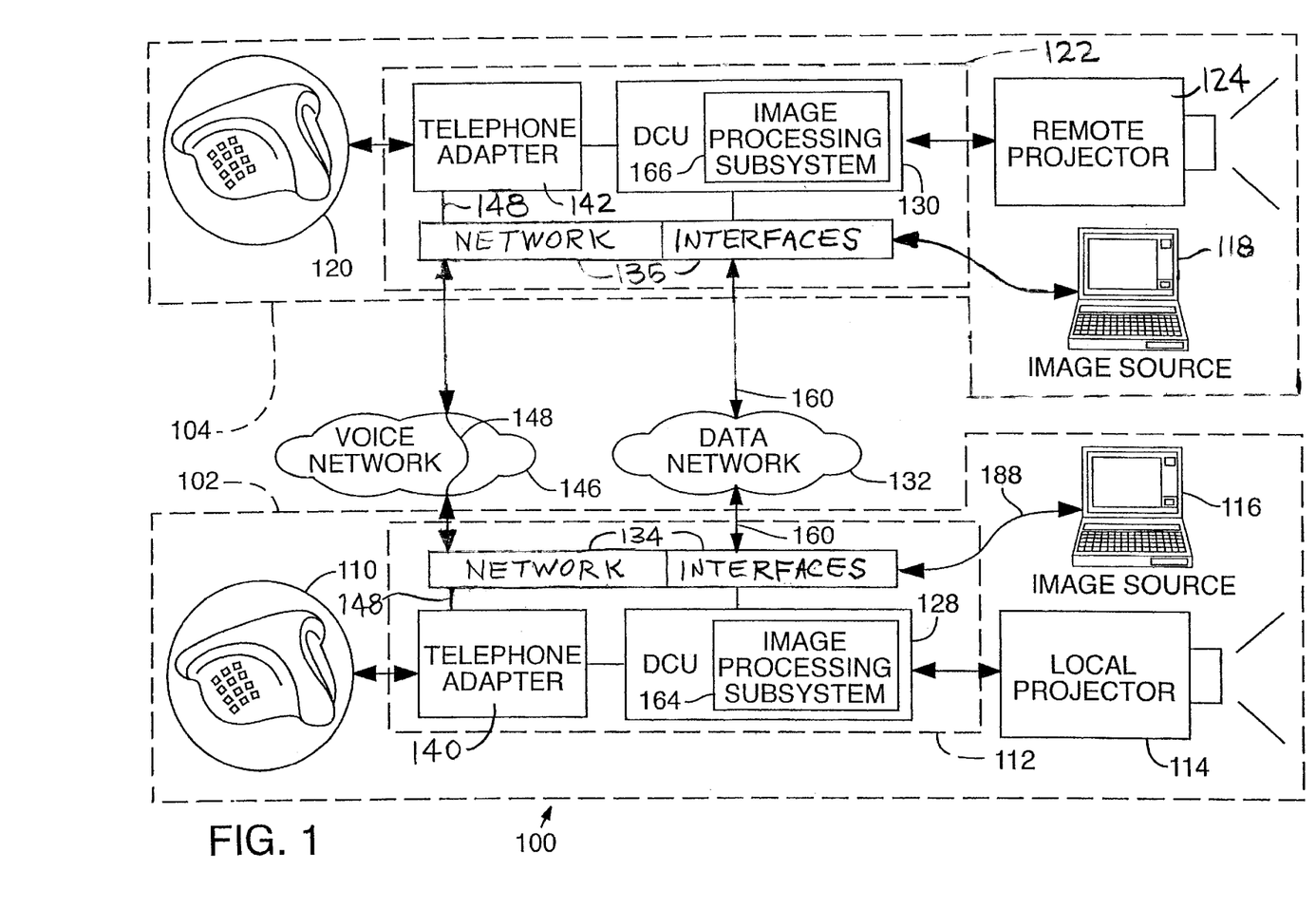
FIG. 1 is a block diagram of a simplified data conferencing system including local and remote data conferencing appliances in accordance with a first preferred embodiment of this invention.

FIG. 1 shows a data conferencing system 100 that is suitable for use with this invention and operating at a local site 102 and a remote site 104. Local site 102 includes a local speakerphone 110 including a local data conferencing appliance 112. A local display device 114, such as a projector, and an image source 116, such as a laptop computer, are also connected to local data conferencing appliance 112. Remote site 104 includes a remote speakerphone 120 connected to a remote data conferencing appliance 122, which is in turn connected to a remote display device 124 and an image source 118, such as a laptop computer. Local and remote data conferencing appliances 112 and 122 include respective local and remote data conference control units 128 and 130, which are coupled to a data network 132 via respective local and remote network interfaces 134 and 136 of data conferencing appliances 112 and 122. Local and remote network interfaces 134 and 136 are preferably integrated with local and remote data conference control units 128 and 130, for example in the form of embedded computers loaded with software embodying data conferencing methods in accordance with this invention, as described below with reference to FIG. 2. Local and remote data conferencing appliances 112 and 122 also include respective local and remote telephone adapters 140 and 142 coupled to a voice network 146 via an incoming telephone line (RJ-11 jack), a handset line of a telephone receiver (RJ-22 jack), or any other means for line communicating audio signals of a voice call. Local and remote telephone adapters 140 and 142 are connected to the respective local and remote data conference control units 128 and 130, e.g., via a data interface, such as a PCI bus, parallel port, or a universal serial bus (USB) (not shown), and to speakerphones 110 and 120, respectively, e.g., via RJ-11 jacks, RJ-22 jacks, or other telephone audio lines (not shown).

The components and arrangement of local speakerphone appliance 110, local data conferencing appliance 112, and local display device 114 may be identical to the corresponding remote speakerphone 120, remote data conferencing appliance 122, and remote display device 124, both in design and arrangement, i.e., system 100 may be symmetric across local and remote sites 102 and 104. However, the components of system 100 need not be symmetric or, for that matter, identical. For example, different schemes of partitioning or integrating some or all of the components of data conferencing system 100 are within the scope of this invention. Furthermore, data conferencing systems suitable for use with this invention need not be limited to two sites and can be used to establish data conferencing sessions within a single site or with more than two sites, and may display one or more source images simultaneously.

Figure 2:
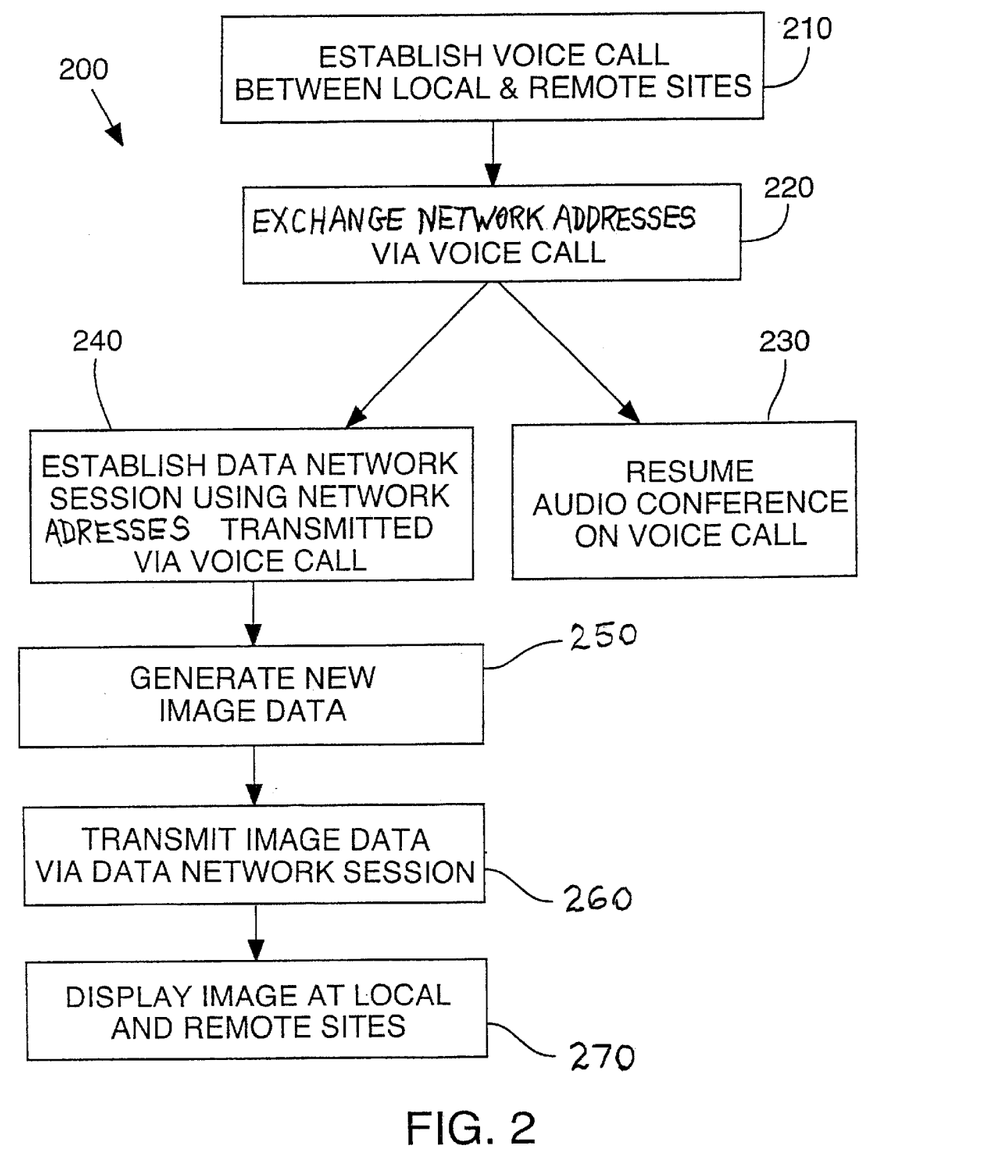
FIG. 2 is a flow chart depicting a data conferencing method performed by the system of FIG. 1.

FIG. 2 is a flow chart depicting a typical data conferencing method 200 performed by data conferencing system 100 of FIG. 1. A voice call 148 (represented by a call path through voice network 146 in FIG. 1) is established between local and remote speakerphones 110 and 120 (step 210). Voice call 148 may be established using conventional telephone dialing (e.g., 7-digit, 10-digit, or 11-digit dialing within North America; international dialing; 3-digit, 4-digit, or 5-digit dialing within a PBX network, and 2-digit or 3-digit dialing within an EKS system) or by other methods, e.g., using VoIP calling methods. Each of the telephone adapters 140 and 142 may include an audio bridge (not shown) that couples respective speakerphones 110 and 120 to voice network 146 and which allows telephone adapters 140 and 142 to passively monitor the telephone line to determine its status, for example, whether the speakerphones 110 and 120 are off-hook and whether voice call 148 has been established.

To establish a data communication session between local and remote sites 102 and 104 via data network 132, a user at one or both of the sites 102 and 104 activates system 100 at any time during the voice call session using an input key (not shown). Preferably the input key is a pushbutton that can be manually actuated by a user. Manually activating the input key sets a Boolean variable within the software contained within the initiating data conferencing appliance that causes it to begin an access negotiation procedure (step 220) (hereinafter "negotiation procedure"). The input key may be manually activated a second time to terminate the data communication session. The following example of the negotiation procedure involves initiation of the negotiation procedure at local site 102; it being understood that the negotiation procedure could, alternatively, be initiated from remote site 104. To enable the negotiation procedure via voice network 146, local and remote telephone adapters 140 and 142 include circuitry that generates audio signals (not shown) and transmits them within the voice call 148 in response to commands, which are issued by the negotiation procedure. The telephone adapters 140 and 142 also include circuitry for recognizing such audio signals when received via voice call 148. At least some of the audio signals transmitted in accordance with the negotiation procedure encode a network device access code.

The network device access code (hereinafter "network access code" or "access code") address may be any type of computer network address, or data network address, or code associated with data conferencing appliances 112, 124, or with the data conferencing session itself, such as, for example, a domain name, a URL, an IP address compliant with IPv4 or IPv6 (including IPv4 with CIDR), a virtual address (such as a multicast group address), or a physical address (e.g., an Ethernet address or other MAC address)), a session ID, or a passcode. The format for the address is predefined and commonly available to the negotiation procedures of the data conference control units 128 and 130, and may include a 32-bit IPv4 address expressed as a series of 12 decimal digits, for example. Audio signals used for transmitting the network access code (and any other data transmitted during access negotiation) may include blank-and-burst techniques, DTMF tones, notch modem signals, and other types of electronically generated audio signals capable of transmitting data within an active voice call session with little or no interruption of the voice call and without terminating the voice call session.

After receipt of the audio signals at remote data conferencing appliance 122 and subsequent recognition of the network access code, the remote data conferencing appliance 122 replies with its network access code. Thereafter, data conferencing system 100 resumes the audio conference portion of the data conference via voice call 148 (step 230). Concurrently with resumption of the audio conference, local and remote data conferencing appliances 112 and 122 establish a data network session 160 over data network 132 via their respective network interface modules 134 and 136 (step 240), preferably using known Internet protocols.

Local image processing subsystem 164 may include a frame buffer (not shown) for receiving frames of image data 188 from image source device 116 and for sensing changes in the image represented by image data 188. When a change is sensed by local image processing subsystem 164, the current frame of image data 188 is processed for display on local display device 114 (step 250) and, separately, compressed for transmission within data network session 160. Preferably, however, frame buffering and change detection is performed in software on image source device 116 to reduce the amount of data 188 transmitted between image source 116 and local data conferencing appliance 112.

To improve the responsiveness and efficiency of system 100, local and remote network interfaces 112 and 122 preferably include respective local and remote image processing subsystems 164 and 166 for compressing image data prior to transmission via data network session 160 and for decompressing image data upon receipt. In the alternative, compression of images may be performed in software or hardware at image source 116, with decompression being performed only at local and remote image processing subsystems 164 and 166 prior to delivery of substantially identical uncompressed images to the respective local and remote display devices 114 and 124 connected thereto. Image processing subsystems 164 and 166 may also perform image scaling for resizing images to fit the pixel resolution of the respective local and remote display devices 114 and 124 prior to delivery of the images.

In addition to handling the transmission of image data within data network session 160, local and remote data conferencing appliances 112 and 122 are coupled to respective local and remote display devices 114 and 124 for exchanging control data (not shown) for controlling the images displayed, for reporting error conditions, and for communicating any other information useful for facilitating the data conference.

Once the data network session 160 has been established and image data generated, data conferencing system 100 is enabled for transmitting the image data between local and remote sites 102 and 104 via data network session 160 (step 260) while the audio component of the data conference is carried by voice call 148 (step 230). The image data are displayed at local and remote sites 102 and 104 (step 270).

By eliminating the need for image data to be distributed in advance of a data conferencing session to all of the participating data conferencing sites or to a centralized server, this invention allows images to be distributed and displayed dynamically, in real time and nearly concurrently with their generation or playback at the image source. Distribution and display of images dynamically and in real time also reduces image data storage required at each participating data conferencing site. Data conferencing systems in accordance with this invention can also be configured so that no residual image data is left at participating sites after termination of the data conferencing session.

As will be readily understood by those skilled in the art, the functions of the speakerphone, the data conference control unit, the telephone adapter, the network interface, the image processing subsystem, and the display device can be partitioned and configured at each presentation site in any of various ways. Furthermore, the configuration and partitioning of the data conferencing components can result in different connection layouts within each data conference site and to the voice and data networks accessible at the sites.

Figure 3:
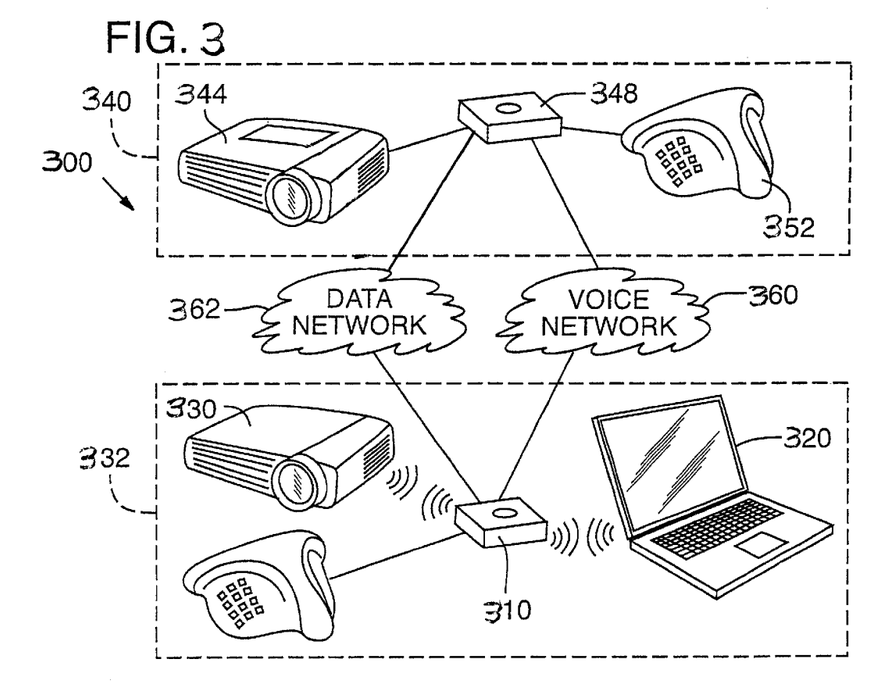
FIG. 3 is a network diagram showing a preferred embodiment of a data conferencing system, in which the local data conferencing appliance includes wireless networking equipment for communication with a local wireless-enabled projector and a local wireless-enabled image source device.

FIG. 3 is a network diagram showing a preferred embodiment of a data conferencing system 300 in which a local data conferencing appliance 310 includes wireless networking equipment (not shown) for communicating with a similarly equipped image source 320 and a similarly equipped display device 330 at a local site 332. At a remote site 340, a remote display device 344, a remote data conferencing appliance 348, and a remote speakerphone 352 are connected to respective voice and data networks 360 and 362. Any of various wireless networking technologies can be employed for the wireless networking equipment of local data conferencing appliance 310, image source 320, and local display device 330. For example, equipment operating in accordance with any of the IEEE 802.11 standards may be used. Alternative wireless network technologies useful with this invention include Home RF, infrared networking, and any other short- and long-range wireless networking systems and devices, including short-range peer-to-peer wireless networking such as BLUETOOTH. Skilled persons will appreciate, however, that the data transfer rates and available bandwidth supported by the different wireless networking technologies will adversely affect system performance. Therefore, for efficient wireless transmission between the components of system 300, it is preferred to employ the image data compression and decompression process of this invention, which are described with reference to FIGS. 5 and 6.

Figure 4:
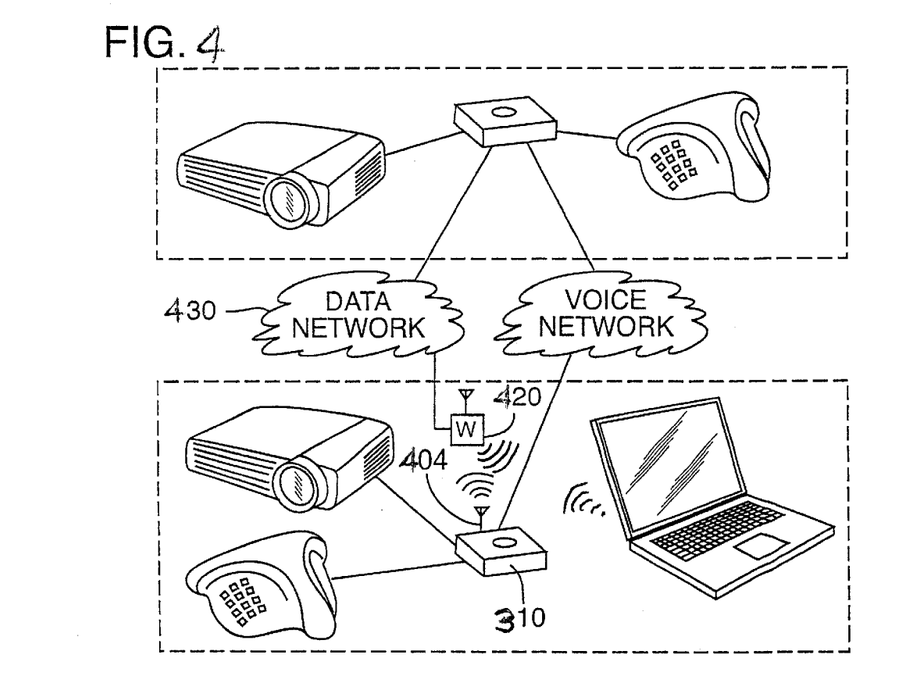
FIG. 4 is a network diagram of the data conferencing system of FIG. 3 in which the local data conferencing appliance further includes wireless networking hardware for communication with an infrastructure wireless networking access point.

FIG. 4 is a network diagram of the data conferencing system of FIG. 3 in which local data conferencing appliance 310 further includes wireless LAN hardware 404 for communication with an infrastructure wireless networking access point 420 coupled to a data network 430. Skilled persons will understand that numerous other variations on wireline and wireless networking connections can be employed in accordance with this invention. The specific combinations of wired and wireless networking shown in FIGS. 3 and 4 are exemplary only and should not be construed as limiting the extent to which wired or wireless networking may be used with data conferencing appliances, system components, and data compression and decompression processes embodying this invention. In general, any of the network connections connecting components of conventional data conferencing systems can be replaced with wireless links for transmitting data or audio-bearing signals, and may employ the data compression and decompression processes of this invention.

In particular, the data compression and decompression processes of this invention employ dual compression for first compressing data, such as a computer screen image, and transferring the compressed data over a wireless network, such as a IEEE 802.11b transport medium. The transported compressed image data is then decompressed using dual decompression for reconstructing the original image. The combined compression and decompression technique provides high performance, high image quality, good compression, and is perceptibly lossless. The compression and decompression technique may be used over virtually any wired or wireless communications channel.

Figure 5:
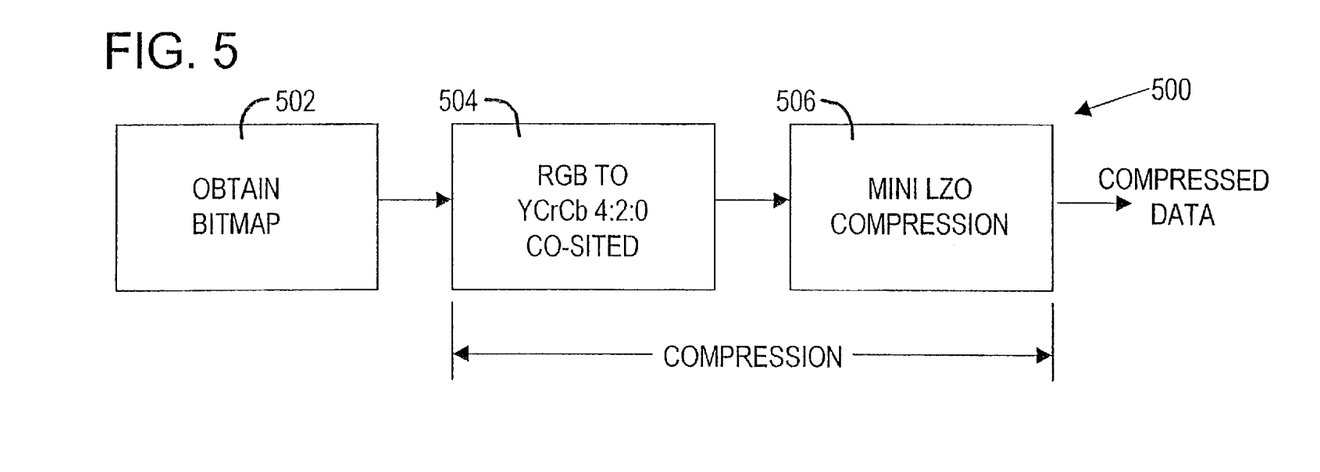
FIG. 5 is a simplified functional block diagram representing a data compression process of this invention.

FIG. 5 shows a preferred data compression process 500 of this invention. The data source is a full screen, color, XGA image (although other resolutions and color depths may be employed), which is processed to obtain a bitmap 502. A two step compression process is employed to obtain the required amount of data compression. The first step employs a color conversion compression process 504, and the second step employs a real-time LZ, or preferably an LZO compression process 506, which generates the compressed data for transmission through a transmission medium. Skilled workers will understand that the terms LZ and LZO refer to algorithms and not to a specific executable application program with a specific function. The algorithms are data compressors that may be employed within an application program to create a file (data set) compressor.

Figure 6:
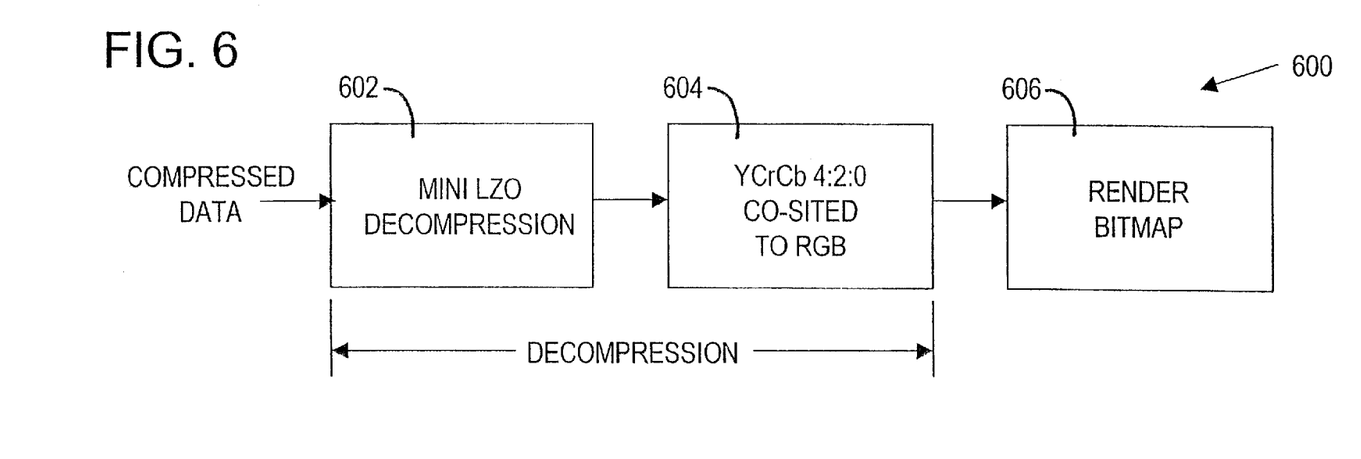
FIG. 6 is a simplified functional block diagram representing a data decompression process of this invention.

FIG. 6 shows a data decompression process 600 of this invention. The compressed data from LZO compression process 506 (FIG. 5) is applied to a two step decompression process. The first step employs an LZO decompression process 602, and the second step employs a color conversion decompression process 604, which generates decompressed data for rendering a bitmap 606 that is substantially the same as bitmap 502 (FIG. 5).

The LZO compression and decompression processes 506 and 602 are available as documented open source and object code by downloading from the Internet at URL address www.oberhumer.com/opensource/lzo. LZO implements the fastest compression and decompression algorithms currently available. LZO is a real-time, portable, lossless, data compression library written in ANSI C that provides very fast compression and extremely fast decompression. LZO favors speed over compression ratio.

LZO implements a number of algorithms with the following features: No memory is required for decompression. Only 64 kilobytes of memory are required for compression. Extra compression can be traded off for speed, while the decompression speed is not reduced. LZO includes compression levels for generating pre-compressed data to achieve high compression ratios. LZO includes a compression level requiring 8 kilobytes of memory. The algorithm is thread safe and lossless. LZO supports overlapping compression and in-place decompression. LZO and the LZO algorithms and implementations are distributed under the terms of the GNU General Public License.

LZO is available for a variety of platforms including DOS (16 and 32 bit), Windows 3.x (16-bit), Windows 95/98/NT, Linux, HPUX and a DEC Alpha (64-bit). LZO is also reported to work under AIX, ConvexOS, IRIX, MacOS, Nintendo 64, PalmOS (Pilot), PSX (Sony Playstation), Solaris, SunOS, TOS (Atari ST) and VxWorks.

A preferred set of LZO compression and decompression processes 506 and 602 are referred to as miniLZO, which is a compact subset of the LZO library. MiniLZO implements a LZO1X-1 compressor and both a standard and safe LZO1X decompression. Apart from fast compression it also useful for use with pre-compressed data files, such as files compressed with LZO1X-999. MiniLZO consists of one C source file and two header files. It compiles on an i386 platform to about six kilobytes.

An alternative preferred set of LZO compression and decompression algorithms are referred to as LZOP, which employ the LZO data compression library for compression services. LZOP is currently the fastest compressor and decompression available. Precompiled binaries are available for use in platforms running Windows 95/98/ME/NT/2000/XP, 32-bit DOS, and OS/2.

Data compression and decompression processes 500 and 600 of this invention meet the goal of achieving a one second latency time for transferring a full XGA image from, for example, a laptop computer to, for example, a projector when using a wireless transport medium. The worst-case latency time requires that a full XGA screen must be moved from the laptop computer to the projector in one second. Assuming an XGA color image having three bytes (24-bits) per pixel, the image has a total of 1024 by 768 by 24 bits, which equals 18,874,368 bits (2,359,296 bytes) that must be transferred in one second or less.

To know whether this performance goal can be met, the total system latency time must be known, which is impossible until the system is designed and configured. If the system latency time is too long, data compression methods must be used, assuming sufficient computing power is available, to compress the amount of data being transferred. Data compression is a computationally intensive process that is generally linear with the required compression ratio. For example, holding computer power constant, 40:1 data compression generally requires 10 times more execution time than 4:1 compression of the same data. Alternatively, holding time constant, 40:1 data compression requires 10 times more computing power than 4:1 data compression. Of course, other resolution and color depth combinations lower are also usable with this invention.

An IEEE 802.11b wireless transport system employing TCP/IP is capable of transferring approximately 524,000 bytes per second. Assuming 2,359,296 bytes must be transferred, then 2,359,296 divided by 524,000 equals 4.5 seconds to transfer the uncompressed XGA frame of data. This means that data compression is required in an 802.11b system employing TCP/IP to achieve 1 second latency. Accordingly, about a 4.5:1 data compression ratio is required to achieve a one second or less transfer time.

There are also image quality considerations. Data compression techniques are either lossless or lossy. Lossless techniques have limited compressibility, whereas lossy techniques generate image artifacts. With the goal of "replacing a wire with a wireless medium," the image must be perceptibly lossless. That is, a user should not be able to visually detect the use of data compression.

Achieving 4.5:1 compression of color images is a difficult goal. This level of compression is generally achieved by employing the well-known, albeit lossy JPEG compression process. Unfortunately, the JPEG process requires a significant amount of computation, i.e. it takes a long time. If the JPEG process is employed, an unacceptable trade-off must be made to transmit an unacceptably low-quality image having significant image artifacts. Moreover, in a typical data conferencing system, there is a limited amount of computing resource available for running data compression and decompression processes because the computer is generally busy executing application programs, such as for example, PowerPoint, animations from which use nearly all the available computer resources.

"Compression" is a generic word meaning to make a data set smaller. However, the definition of compression does not address how the compression is accomplished. For example, truncation and recoding are two different compression methods. Each type of compression capitalizes on some characteristic in the underlying data. In most compression schemes, more than one such method is employed. For example, converting the original data into code words, and then coding the code words. In choosing one or more methods for this application, it is clear they must execute quickly, but whereas a 4.5:1 compression ratio is required, it is unknown how much time is available for processing this compression. From a practical standpoint, with a latency of only one second, for IEEE 802.11b, most of the latency time budget is used in the wireless channel, and practically none is left for compression and decompression.

Assume, for example, that a 5.5:1 compression ratio is possible resulting in a wireless channel latency of about 0.8 seconds. This leaves 0.2 seconds for compressing and decompressing the data. Assuming a symmetric algorithm, 2,359,296 bytes must be compressed in 0.1 seconds. Therefore, compression algorithms capable of compressing 24 megabytes per second must be employed, which are referred to as real-time compressors. Moreover, some compressors work well on color image data, and some do not.

Using the preferred LZOP compression process, the estimated time to compress a full XGA screen image on a 1 GHz Pentium III is calculated as 0.89 divided by 12.3, which equals 0.072 seconds. The estimated time to decompress a full XGA screen image on a 1 GHz Pentium III is calculated as 0.3 divided by 12.3, which equals 0.024 seconds.

Referring again to FIGS. 5 and 6, employing color conversion compression and decompression processes 504 and 604 further reduces the amount of data requiring processing and transmission. This is achieved by employing a color space conversion that is outside the human perceptual range. RGB-to-YCrCb 4:2:0 co-sited color space conversion meets this criteria and is the color space conversion employed in professional 576-line digital video application and in digital video camcorders. In the 24-bit RGB color space model, three bytes are required for each pixel. YCrCb 4:2:0 co-sited color space employs one byte to describe Y at each pixel, one byte to describe Cr at every fourth pixel, and one byte to describe Cb at every fourth pixel. This reduces by half the amount of data requiring compression by LZO. In particular, compressing a full XGA screen image containing 2,359,296 bytes by converting it to YCrCb color space, compresses the data to 1,179,648 bytes. Because this is half the amount of data than that was transmitted in the above example computations, the overall compression time is estimated as 0.072 divided by two, which equals 0.036 seconds.

While LZOP produced a 2.17:1 compression ratio on the Waterloo Bragzone Colorset, computer generated graphics are more highly compressible than photographic images. Therefore, when employing computer graphic data, an additional 10% compressibility is conservative, and 25% is nominal. For example, if the compressibility is increased by 10% for computer generated graphics, the 1,179,648 bytes are further compressed down to 1,179,648 divided by 2.39, which equals 493,577 bytes. The resulting in-channel latency is estimated as 493,577 divided by 524,000, which equals 0.94 seconds. Therefore, this invention meets the one second latency goal.

High-performance color conversion is required to meet the one second latency goal. Color conversion is normally accomplished with floating point calculations. However there are typically insufficient computing resources available, so a high-speed integer embodiment of this invention is preferably employed.

As described above, RGB-to-YCrCb co-sited 4:2:0 color conversion is employed. There are, however, many sets of color conversion coefficients available for performing this conversion. The following conversion equations are derived from the method described in Part 2 of the ITU-R BT.709-4 specification. Input RGB data is in a 4:4:4 format, and output YCrCb data is generated in a 4:2:0 format. Eqs. 1–3 contain factored versions of Cr and Cb to reduce the number of multiplications required.

$$Y = 0.2126R + 0.7152G + 0.0722B \qquad (1)$$

$$Cr = 0.6350\ (R-Y) \qquad (2)$$

$$Cb = 0.5389\ (B-Y) \qquad (3)$$

Higher performance is achieved by preferably employing a factored integer version of the equations. The following Eqs. 4–6 are equivalent to Eqs. 1–3, but are expressed as integer arithmetic scaled up by a 65,536 factor. 32-bit integer calculations are employed with the binary point to the left of bit 15.

$$Y = 13933R + 46871G + 4732B \qquad (4)$$

$$Cr = 41615\ (R-Yd) \qquad (5)$$

$$Cb = 35317\ (B-Yd) \qquad (6)$$

YCrCb-to-RGB decompression process 604 employs a three stripe interpolation method to reconstitute the compressed image. This method assists in preventing cache misses during image reconstitution maintaining the full speed of the receiving processor.

Skilled workers will recognize that portions of this invention may be implemented differently from the implementations described above for preferred embodiments. For example, the invention is not limited to the compression and decompression of XGA image data, nor to the one second latency time goal. The data conferencing component arrangements are not limited to those described and may include multiple local and remote image sources. Images may be presented in various formats including split screen, side-by-side, picture-in-picture, alternated, rotated, or tiled at the user's direction or by other criteria. Moreover, the data conferencing appliances and compression and decompression processes of this invention may be implemented in software operating on a computer workstation that can also serve as the display device, telephone receiver, and/or image source; or in hardware as a simplified data conferencing appliance that can be used with a separate telephone receiver, display device, and image source.

It will be obvious to those having skill in the art that many changes may be made to the details of the above-described embodiments of this invention without departing from the underlying principles thereof. Accordingly, it will be appreciated that this invention is also applicable to data compression and/or decompression applications other than those found in multimedia data conferencing. The scope of this invention should, therefore, be determined only by the following claims.

I claim:

1. A method, comprising:

receiving a first data set having a first data set;

compressing the first data set to generate a second data set having a second data set size, smaller than the first data size in t1 units of time;

compressing the second data set to generate a third data set having a third data set size, smaller than the second data size, in t2 units of time transmitting the third data set to a recipient through a communication link in t3 units of time, where t1+t2 is less than or equal to t3, and t3+t4 is less than or equal to a latency requirement, t4 being an amount of time required to recover the first data set from the received third data set.

2. The method of claim 1, in which the first data set comprises multimedia data represented in a first color space, and the compressing of the first data set comprises converting the multimedia data to be represented in a second color space having a less data intensive representation format.

3. The method of claim 1, in which the compressing of the second data set comprises applying an Lempel-Ziv-Oberhumer (LZO) compression process to the second data set.

4. The method of claim 1, in which the first data set comprises multimedia data, and the method furhter comprises recovering first the second data set, then the first data set, and then rendering the multi-media data on a display.

5. The method of claim 1, further including transmitting the third data set through a wireless transmission medium.

6. The method of claim 5, in which the transmission medium includes a transmission medium selected from a group consisting of a IEEE 802.11 transmission medium, a home RF transmission medium, and a BLUETOOTH transmission medium.

7. The method of claim 1, in which the first data set comprises multimedia data represented in a red, green, blue ("RGB") color space, and the compressing of the first data set comprises converting the multimedia data to be represented in a YCrCb color space.

8. The method of claim 7, in which the converting is performed using factored integer arithmetic.

9. The method of claim 8, in which the latency requirement is one second or less.

10. The method of claim 1, in which the compression of the second data set employs a miniLZO algorithm.

11. The method of claim 1, in which the compression of the second data set employs an LZOP algorithm.

12. An apparatus comprising:
   first one or more components equipped
      to compress a first data set with a first data size to generate a second data set having a second data set with a second data size, smaller than the first data size, in t1 units of time, and
      to compress the second data set to generate a third data set having a third data set size, smaller than the second data set size, in t2 units of time; and
   second one or more components coupled to the first one or more components, equipped to transmit the third data set to a recipient through a communication link in t3 units of time, where t1+t2 is less than or equal to t3, and t3+t4 is less than or equal to a latency requirement, t4 being an amount of time required to recover the first data set from the received third data set.

13. The apparatus of claim 12, in which the first data set comprises multimedia data represented in a first color space, and the first one or more components are equipped to convert the multimedia data to be represented in a second color space having a less data intensive representation format.

14. The apparatus of claim 12, in which the first one or more components are equipped to apply an Lempel-Ziv-Oberhumer (LZO) compression process to the second data set.

15. The apparatus of claim 12, in which the second one or more components are equipped to transmit the third data set through a wireless transmission medium.

16. The apparatus of claim 12, in which the first data set comprises multimedia data represented in a red, green, blue ("RGB") color space, and the first one or more components are equipped to convert the multimedia data to be represented in a YCrCb color space, using factored integer arithmetic.

17. The apparatus of claim 12, wherein the apparatus comprises a data conference control unit having said first and second one or more components.

18. The apparatus of claim 12, wherein the apparatus comprises a workstation, and the first one or more components comprises software components of the workstation.

19. An apparatus comprising:
   means for compressing a first data set with a first data size to generate a second data set having a second data set with a second data size, smaller than the first data size, in t1 units of time;
   means for compressing the second data set to generate a third data set having a third data set size, smaller than the second data set size, in t2 units of time; and
   means for transmitting the third data set to a recipient through a communication link in t3 units of time, where t1+t2 is less than or equal to t3, and t3+t4 is less than or equal to a latency requirement, t4 being an amount of time required to recover the first data set from the received third data set.

* * * * *